United States Patent [19]
Yokota et al.

[11] Patent Number: 5,914,980
[45] Date of Patent: Jun. 22, 1999

[54] WIRELESS COMMUNICATION SYSTEM AND DATA STORAGE MEDIUM

[75] Inventors: Tsuneshi Yokota; Seiji Ohura, both of Kanagawa-ken; Takanobu Ishibashi, Tokyo; Hiroyasu Uchida, Kanagawa-ken; Takafumi Watanabe, Kanagawa-ken; Tetsuo Saito, Kanagawa-ken, all of Japan

[73] Assignee: Kabushiki Kaisha Toshiba, Kawasaki, Japan

[21] Appl. No.: 08/717,017

[22] Filed: Sep. 20, 1996

[30] Foreign Application Priority Data

Sep. 21, 1995 [JP] Japan ................................. 7-243419
Oct. 4, 1995 [JP] Japan ................................. 7-257292

[51] Int. Cl.$^6$ ................................................. H04B 15/00
[52] U.S. Cl. ........................................ 375/200; 375/219
[58] Field of Search .................................. 375/200, 206, 375/208, 219, 358

[56] References Cited

U.S. PATENT DOCUMENTS

| | | | |
|---|---|---|---|
| 4,587,661 | 5/1986 | Schiff | 375/1 |
| 4,941,150 | 7/1990 | Iwasaki | 375/1 |
| 5,365,551 | 11/1994 | Snodgrass et al. | 375/1 |
| 5,438,589 | 8/1995 | Nakamura | 375/200 |
| 5,493,583 | 2/1996 | Cripps | 375/219 |
| 5,504,776 | 4/1996 | Yamaura et al. | 375/208 |
| 5,533,045 | 7/1996 | Hasegawa et al. | 375/200 |
| 5,539,775 | 7/1996 | Tuttle et al. | 375/200 |
| 5,568,512 | 10/1996 | Rotzoll | 375/221 |
| 5,687,190 | 11/1997 | Tsao | 375/206 |

OTHER PUBLICATIONS

Seminar Text; Spread Spectrum System and High-Speed Data Communication Technology; pp. 1–9 (Japanese text).

*Primary Examiner*—Stephen Chin
*Assistant Examiner*—Mohammad Ghayour
*Attorney, Agent, or Firm*—Pillsbury Madison & Sutro LLP

[57] ABSTRACT

A wireless communication system performs wireless transmitting and receiving of data between first and second communication devices. The device transmits from the first communication device to the second communication device a prescribed signal by a prescribed carrier signal having a prescribed carrier frequency. The prescribed signal transmitted from the first communication device is received in the second communication device. The device generates in the second communication device a signal of prescribed frequency which is phase synchronous with the prescribed carrier signal. Transmission data is spread spectrum modulated using the signal of prescribed frequency generated in the generating step. The spread spectrum modulated signal is transmitted from the second communication device to the first communication device. The first communication device receives the spread spectrum modulated signal transmitted from the second communication device.

12 Claims, 10 Drawing Sheets

WIRELESS COMMUNICATION SYSTEM AND DATA STORAGE MEDIUM

BACKGROUND OF THE INVENTION

1. Field of the Invention

The present invention relates to a wireless communication system that is used for exchanging data between, for instance, a portable no-battery type wireless card (a second communication device) comprising a data storage medium equipped with a wireless communication function and a wireless card reader/writer (a first communication device) used as a communication system.

Further, the present invention also relates to a data storage medium such as a no-battery type wireless card used in the wireless communication system described above.

2. Description of the Background Art

In recent years, a no-battery type wireless card has been developed to serve as a portable data storage medium equipped with a wireless communication function. In a wireless communication system using this type of wireless card, data is transmitted/received to/from the wireless card using a wireless card reader/writer. That is, power and data are transmitted/received to/from the wireless card from the wireless card reader/writer, and data is also transmitted/received to/from the wireless card reader/writer by the wireless card.

More recently, wireless cards have been developed and put to practical use using a spread spectrum communication system.

This spread spectrum communication system is a system to expand the bandwidth sharply through a signal conversion using means other than transmitting data signals and to obtain the original data at a receiving side through a reverse signal conversion. There are two representative methods of signal conversion. One is a method to multiply a broad bandwidth false random code (a direct spread modulation). The other is a method to select carrier frequency according to the order decided by the false random code of the broad bandwidth (a frequency hopping modulation).

With this method, code split and multiplication are possible by different false random codes, power spectrum density is low and the signal can be concealed, and disturbance to the narrow bandwidth communication is less and resistance against disturbance is high.

This type of wireless card uses a high precision crystal oscillator for performing the spectrum spread, and has a built-in battery as an operating power supply.

Further, in a wireless card that has no battery as an operating power supply, power transmitted from a wireless card reader/writer is received and charged in a capacitor for intermittent communication with a wireless card reader/writer.

In order to perform spread spectrum communication and obtain received data by performing the reverse spread at the receiving side, it is necessary to perform the spread encoding for spread spectrum at a highly accurate frequency and for this purpose, a crystal oscillator is integrated in a wireless card.

However, for a low price wireless card, for instance, the size of a general credit card (0.76 mm thick), this crystal oscillator is large. Even when it could be incorporated in such a wireless card, it is vulnerable against bending and pressing forces. In addition, while all other circuits are integrated into a single chip LSI, the cost of the crystal oscillator is a large problem.

Further, in the case where a battery is built in, the operating life of a wireless card will be shortened if the life of the built-in battery is expired. In the case of a wireless card without a built-in battery, the intermittent communication for charging presents problems in communication speed and operating stability.

In addition, a highly functional wireless card having no built-in battery will have such capabilities as high speed processing, strengthened security, etc. These capabilities require that the wireless card be provided with a microprocessor, and with a clock speed of several MHz to several ×10 MHz.

In the case of a conventional wireless card with no battery, internal clock and power operations are generated from several ×10 to several ×100 KHz received carrier but it was difficult to obtain several ×10 to several MHz to several ×10 MHz clock required for CPU from several ×10 to several ×100 KHz received carrier.

Further, in case of a conventional wireless card with no battery, the internal operating clock is generated from an intermittent communication carrier (several ×10 to several ×100 KHz) and therefore, continuous clocks of several MHz required for CPU could not be obtained.

Because of these problems, a microprocessor could not be incorporated in a wireless card having no battery.

SUMMARY OF THE INVENTION

An object of the present invention is to provide a wireless communication system and data storage medium without the need for an unreliable yet expensive crystal oscillator or an expensive yet limited life battery. A further object is to provide such a system and data storage medium capable of performing continuous and stable communication.

Another object of the present invention is to provide a data storage medium which uses a wireless communication function to operate a microprocessor by obtaining from a received frequency a continuous clock having a frequency of several to 10 times several MHz.

According to the present invention, a wireless communication system performs wireless communication between first and second communication devices. A mechanism is provided for transmitting from the first communication device to the second communication device a prescribed signal by a first carrier signal having a first carrier frequency. A receiving mechanism receives in the second communication device the prescribed signal transmitted from the first communication device. A mechanism generates from the prescribed signal received by the receiving mechanism a signal having a second carrier frequency and a signal of a prescribed frequency that are phase synchronous with the first carrier frequency. A spread encoding mechanism spread encodes transmission data using the signal of the prescribed frequency generated by the generating means, and a modulating mechanism modulates the encoded transmission data obtained from the spread encoding mechanism by the signal of the second carrier frequency. A transmitting mechanism transmits the modulated signal obtained from the modulating mechanism to the first communication device from the second communication device. A receiving mechanism receives in the first communication device the modulated signal transmitted from the second communication device.

Further, according to the present invention, a data storage medium is equipped with a reception antenna and a transmission antenna. The data storage medium has a wireless communication function for performing wireless transmission/receiving with an external communication device through the use of these antennas. The data storage medium comprises a receiving mechanism for receiving via the reception antenna a prescribed signal transmitted by a first carrier frequency from the communication device. A first generating mechanism generates from the prescribed signal received by the receiving mechanism a signal of a second carrier frequency that is phase synchronous with the first carrier frequency. A second generating mechanism generates a signal of a prescribed frequency by dividing the signal generated by the first generating means. A spread encoding mechanism transmits data using the signal of the prescribed frequency generated by the second generating mechanism. A phase modulating mechanism phase modulates the second carrier frequency by the spread encoded signal obtained from the spread encoding mechanism. A transmitting mechanism transmits the modulated signal obtained from the phase modulating mechanism to the communication device via the transmission antenna.

Further, according to the present invention a data storage medium is provided which comprises a receiving mechanism that receives a medium wave two-phase modulated signal, a generating mechanism and a microprocessor. The generating mechanism generates based on a received carrier signal received by the receiving mechanism continuous clock pulses of N multiplied short wave band frequency that are phase synchronous with the received carrier signal. The microprocessor is operated by clock pulses generated by the clock pulse generating mechanism.

DETAILED DESCRIPTION OF THE PREFERRED EMBODIMENTS

Hereinafter, the preferred embodiments of the present invention will be described referring to the attached drawings.

Figure 1:
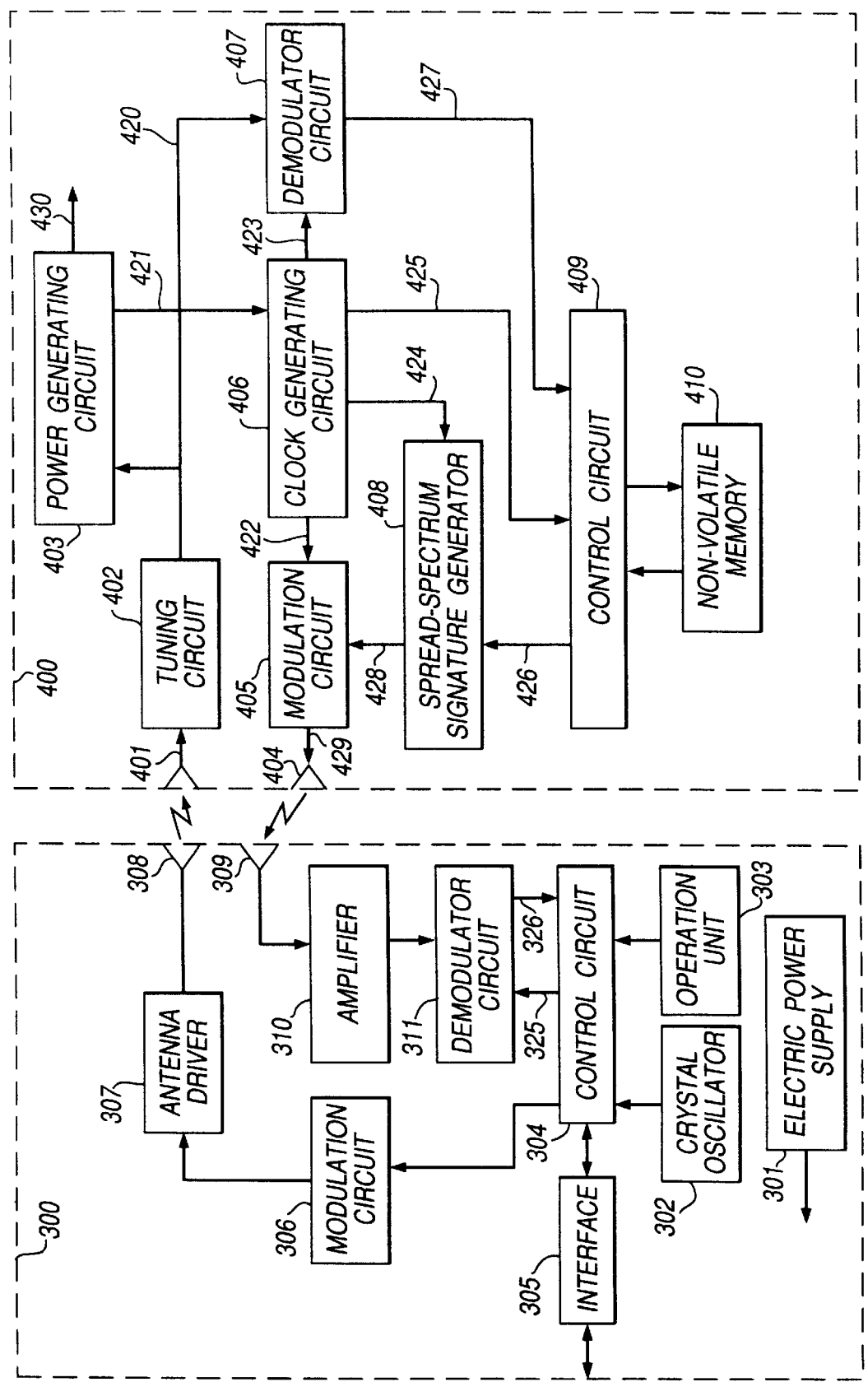
FIG. 1 is a block diagram showing the construction of an embodiment of a wireless communication system of the present invention.

FIG. 1 shows the construction of the wireless communication system of the present invention in a first embodiment.

This wireless communication system is comprised of a wireless card reader/writer 300 as a first communication device and a no-battery type wireless card 400 as a portable data storage medium (a second communication device) equipped with a wireless communication function.

The wireless card reader/writer 300 performs such operations as the transmission of power for power generation, transmission of data read/write commands, processing of read data and transmission of write data to the wireless card 400. This wireless card reader/writer 300 is comprised of a transmission antenna 308, a reception antenna 309, and an antenna driver 307 to drive the transmission antenna 308. A modulation circuit 306 is also provided to modulate and supply transmission data to the antenna driver 307. An amplifier 310 amplifies the received signal through the reception antenna 309, and a demodulation circuit 311 demodulates received data, etc. from the output of the amplifier 310. An interface 305 makes communication with an external device. A crystal oscillator 302 generates a reference clock pulse. An operation unit 303 is also provided which includes a keyboard, etc. A CPU (Central Processing Unit) is provided which controls the entirety of these component units, and an electric power supply 301 is provided to supply operating power to these units.

The wireless card 400 performs various operations including the reception of power for power generation from the wireless card reader/writer 300, command reading, data writing, data transmission, etc. This wireless card 400 is comprised of a reception antenna as a first antenna, a transmission antenna 404 as a second antenna, and a tuning circuit 402 to which the output of the reception antenna 401 is input and several additional mechanisms. A power generating circuit 403 is provided to generate operating power from the output of the tuning circuit 402. A demodulation circuit 407 demodulates received data from the output of the tuning circuit 402. A clock generating circuit 406 receives the full-wave rectified output from the power generating circuit 403, and generates various clock pulses (frequencies). A spread-spectrum signature generator 408 spread encodes a carrier transmitted from the clock generating circuit 406. A modulation circuit 405 modulates carriers transmitted from the clock generating circuit 406 by the output of the spread-spectrum signature generator 408 and transmit to the transmission antenna 404. A non-volatile memory 410 stores transmission data, and a control circuit 409 comprising a CPU controls the entirety, etc.

Hereinafter, the wireless card reader/writer 300 and the wireless card 400 will be described more in detail.

Figure 2:
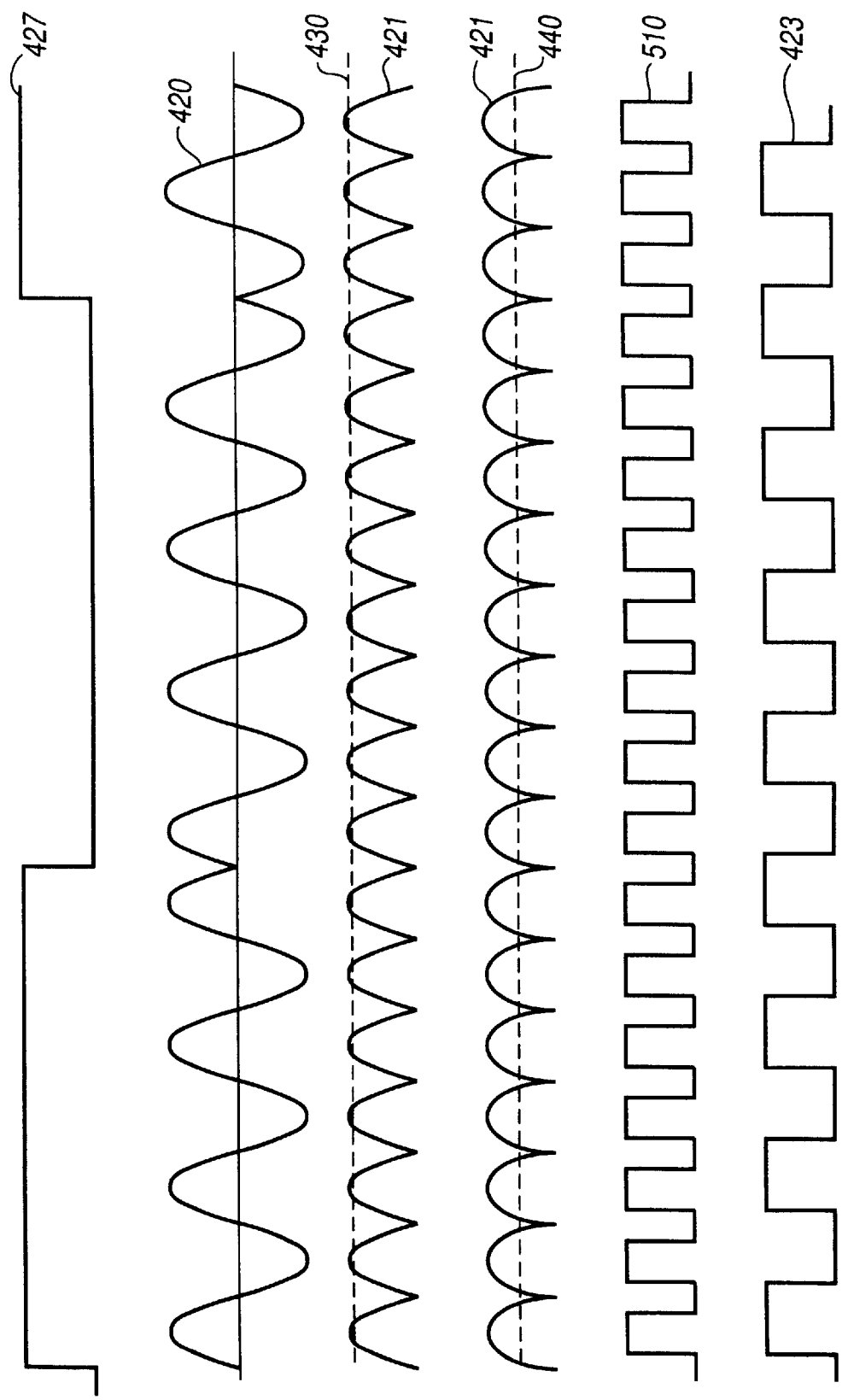
FIG. 2 is a signal waveform diagram for explaining the internal operation of a wireless card which is used in the wireless communication system shown in FIG. 1.

A two-phase modulation signal is transmitted from the transmission antenna 308 of the wireless card reader/writer 300 by a medium wave carrier frequency f1 that is obtained by synchronizing with the output of the crystal oscillator 302. This transmitted two-phase modulated signal is received by the reception antenna 401 of the wireless card 400, and a received voltage 420 as shown in FIG. 2 is obtained from the tuning circuit 402.

This received voltage 420 is input to the power generating circuit 403, where full-wave rectification, smoothing and voltage stabilization are carried out and the power generating output 430 at prescribed voltage is obtained, which is then supplied to each part in the wireless card 400 as the operating power. The full-wave rectified output 421 and its smoothed output (a power generated output) 430 are shown in FIG. 2. The power generation is continuously carried out as long as the two-phase modulated signal is received and the prescribed supply voltage can be obtained.

As the reception antenna 401 continuously receives a medium wave carrier frequency f1 throughout the period when a command is received from the wireless card read/writer 300, and data is received and is transmitted through the transmission antenna 404, power is stably generated in the wireless card 400. Therefore, this wireless card 400 is a no-battery type wireless card requiring no battery.

Further, the system as described above, is capable of achieving the continuous communication when compared with a conventional technique to perform an intermittent communication corresponding to the charged voltage capacity after completing the charge.

Figure 3:
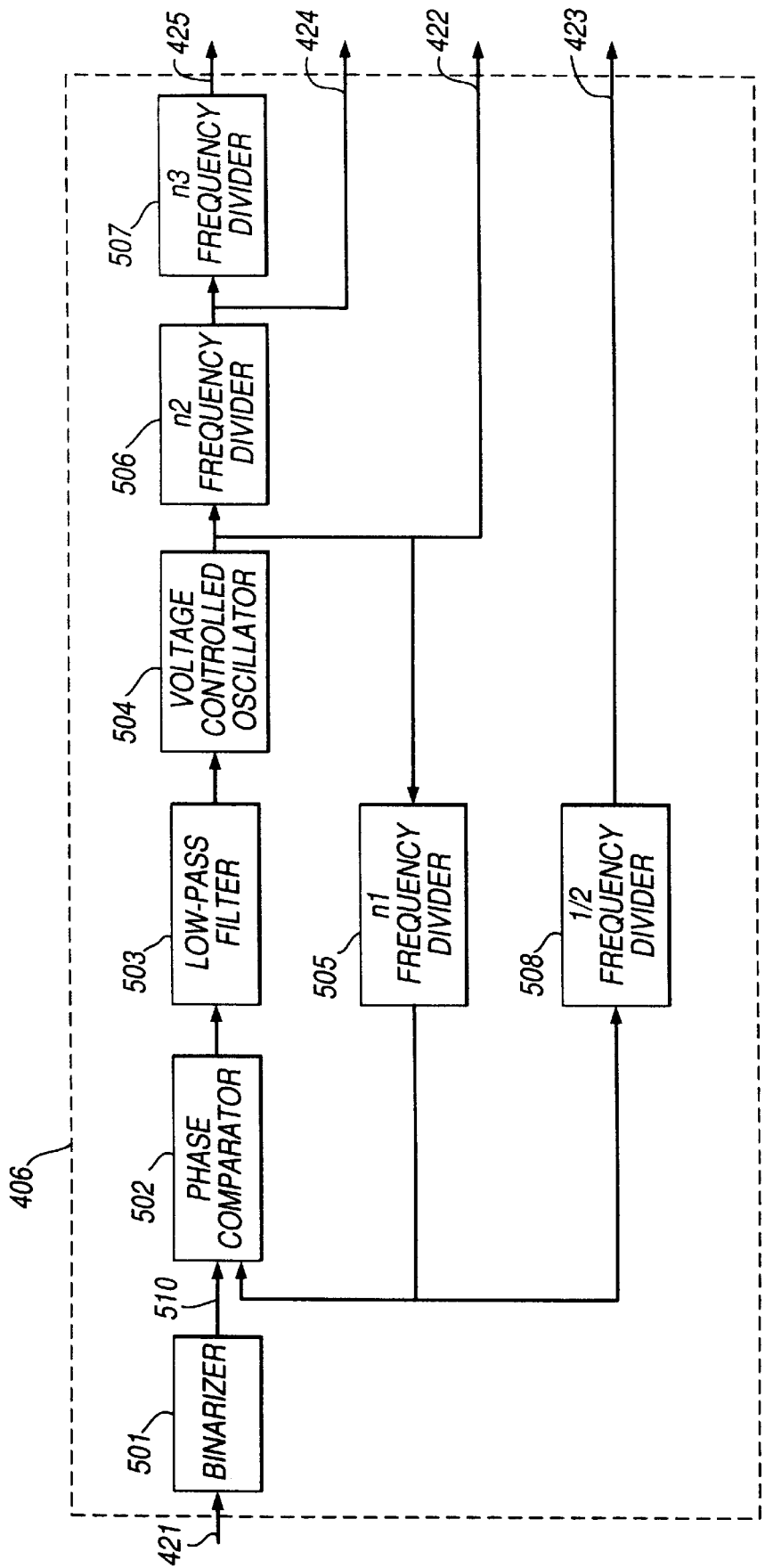
FIG. 3 is a block diagram showing the construction of a clock generating circuit in the wireless card.

The full-wave rectified output 421 from the power generating circuit 403 is input to the clock generating circuit 406. As shown in FIG. 3, the clock generating circuit 406 is comprised of, for instance, a binarizer 501, a phase comparator 502, a low-pass filter 503, a voltage controlled oscillator 504, an n1 frequency divider 505, an n2 frequency divider 506, an n3 frequency divider 507 and a ½ frequency divider 508.

That is, when the full-wave rectified output 421 is input to the binarizer 501, the binarization is carried out at a slice level 440 (see FIG. 2) and a binarized output 510 is produced. This binarized output 510 has a frequency 2f1 that is twice the received carrier frequency f1 as shown in FIG. 2.

The binarized output 510 is input to a PLL circuit where phase synchronization is carried out. The PLL circuit comprises a loop of the phase comparator 502, the low-pass filter 503, the voltage controlled oscillator 504 and the n1 frequency divider 505. As a result, frequency f2 of the output 422 of the voltage controlled oscillator 504 (the phase synchronized output) becomes f2=2f1×n1, that is, 2n1 times the received carrier frequency f1.

The output 422 of the voltage controlled oscillator 504 is input to the modulation circuit 405 to serve as a transmission carrier frequency for transmitting data from the wireless card 400 to the wireless card reader/writer 300, and the modulation is carried out by the output 428 of the spread-spectrum signature generator 408.

The modulated output 429 is transmitted to the wireless card reader/writer 300 through the transmission antenna 404.

As the output 423 of the ½ frequency divider 508 is in accord with and is phase synchronous with the carrier frequency f1 of the received voltage 420, it is possible to obtain a demodulated output 427 by transmitting this output 423 to a demodulator circuit 407 and performing the synchronous detection in the demodulator circuit 407 by the received voltage 420 and the output 423 of the ½ frequency divider 508.

The demodulated output 427 is transmitted to the control circuit 409, where it is treated as a command, read address or received data and the data write/read to/from prescribed address of the non-volatile memory 410 are performed.

Further, in the clock generating circuit 406, the output 422 of the voltage controlled oscillator 504 is input to the n2 frequency divider 506 to obtain the n2 frequency divider output 424, which is then used as shift clock pulse for shift registers 601, 602, 603, 604 and 605, which are described later, in the spread-spectrum signature generator 408 to obtain a spread encoded output 624.

Figure 4:
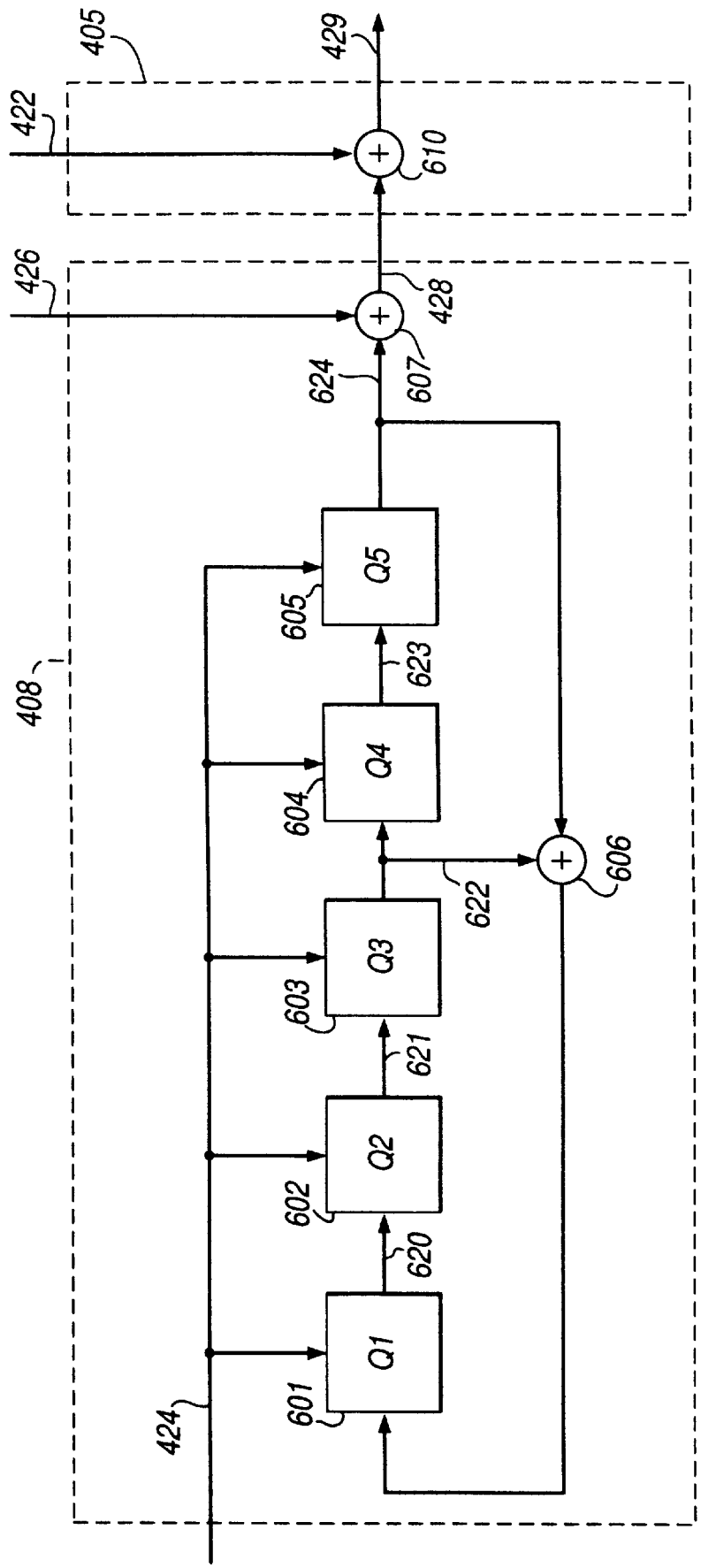
FIG. 4 is a block diagram showing the construction of a spread-spectrum signature generator.
Figure 5:
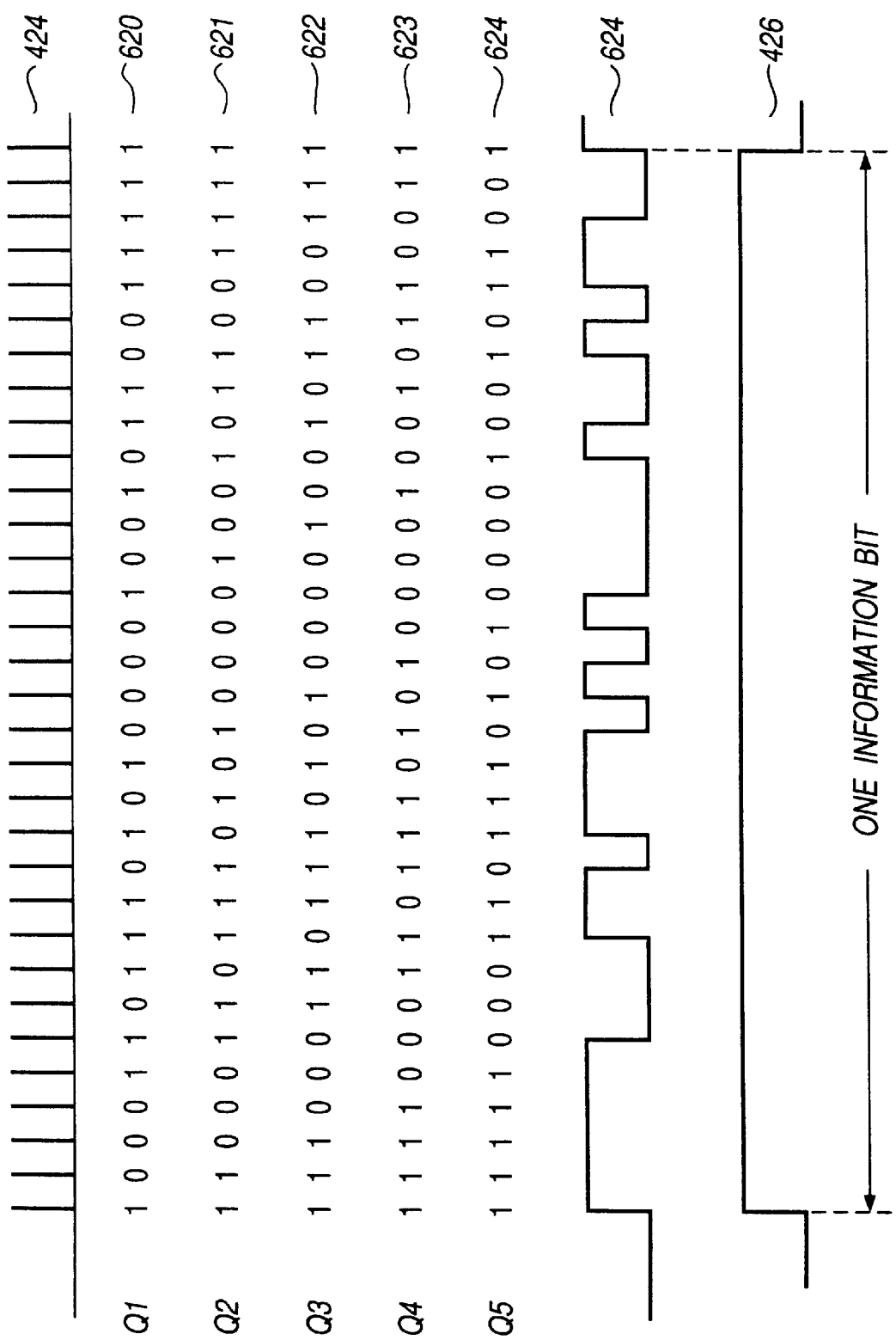
FIG. 5 is a diagram for explaining the operation of the spread-spectrum signature generator.

FIG. 4 shows an example spread-spectrum signature generator 408. It comprises an M-series spread-spectrum signature generator for generating most long signature, comprising cascade connected 5 stage shift registers 601, 602, 603, 604 and 605 and exclusive OR circuits 606 and 607. The period of this spread-spectrum signature generator 408 is output as a spread-spectrum signature output 624 of $2^5-1=31$.

In the clock generating circuit 406, the output 424 of the n2 frequency divider 506 is input to the n3 frequency divider 507 and the 31 frequency division of n3=31 is carried out. It is possible to obtain the transmitted data 426 by using this output 425 of the n3 frequency divider 507 as a data reading clock pulse from the non-volatile memory 410. It is also possible to bring 1 data bit in accord with the spread coded period of the code length 31.

The spread coded output 624 and information data 426 are transmitted to the exclusive OR circuit 607, respectively, where the primary modulation is carried out. Further, the output 428 of the exclusive OR circuit 607 where the primary modulation was carried out is transmitted to the modulation circuit 405, that is, the exclusive OR circuit 610, where phase modulation is carried out on the output 422 of the voltage controlled oscillator 504 used as a transmission carrier frequency. The phase modulated output 429 is discharged through the transmission antenna 404. Thus, the spread spectrum communication from the wireless card 400 to the wireless card reader/writer 300 is carried out.

In the wireless card reader/writer 300, a modulated signal from the wireless card 400 is received by the reception antenna 309, the received signal is amplified in an amplifier 310 and is input to a demodulator circuit 311. In the demodulator circuit 311, a clock pulse 325 of a spread code generator (not shown) for performing the reverse spread is obtained through the phase synchronization with the output of the crystal oscillator 302. Also, the output 424 of the n2 frequency divider 506 generated in the wireless card 400 is obtained through the phase synchronization with the output of the crystal oscillator 302. Therefore, it is possible to accurately tune frequencies and obtain the demodulated output 326 by reverse spreading and decoding spread encoded signals in the wireless card 400 properly.

Next, the arrangement and construction of an IC (integrated circuit) chip 701 will be described, which includes the reception antenna 401, the transmission antenna 404 and other components integrated in a single chip LSI in the wireless card 400. Here, the circuits 402, 403 and 405 to 410 shown in FIG. 1 are large scale integrated and incorporated in the IC chip 701.

Figure 6:
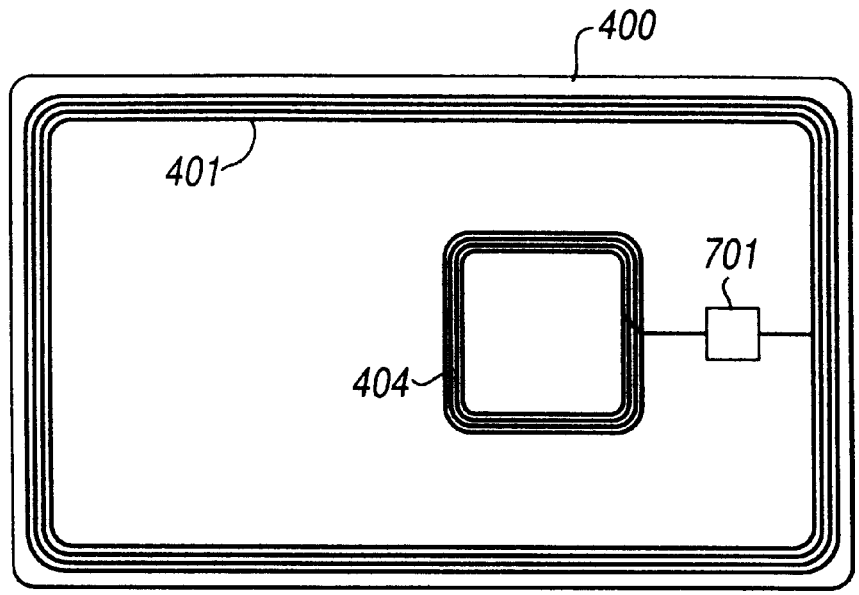
FIG. 6 is a plan view showing a first embodiment with antennas and IC chip arranged in the wireless card.

A first embodiment of the present invention will be first described referring to FIG. 6. The reception antenna 401 is provided as a loop shaped antenna in the vicinity of the outside of the wireless card 400 and the number of turns of the antenna is made larger than the transmission antenna 404 in order to receive medium waves and efficiently obtain power required for each circuit in the wireless card 400.

The transmission antenna 404 is provided as a loop shaped antenna inside the reception antenna 401. The spectrum spread is made through the transmission antenna 404 and is phase synchronized with a received carrier frequency. However, as the transmission is made by a sufficiently higher transmission carrier frequency than this received carrier frequency, the transmission antenna 404 is smaller in size than the reception antenna 401 and has less turns.

The IC chip 701 is arranged outside the loop of the transmission antenna 404 and inside the loop of the reception antenna 401 so that the wirings of the antennas 401, 404 and the IC chip 701 can be arranged without crossing each other. Therefore, it becomes easy to form the IC chip 701 in a 0.76 mm thick credit card size.

Figure 7:
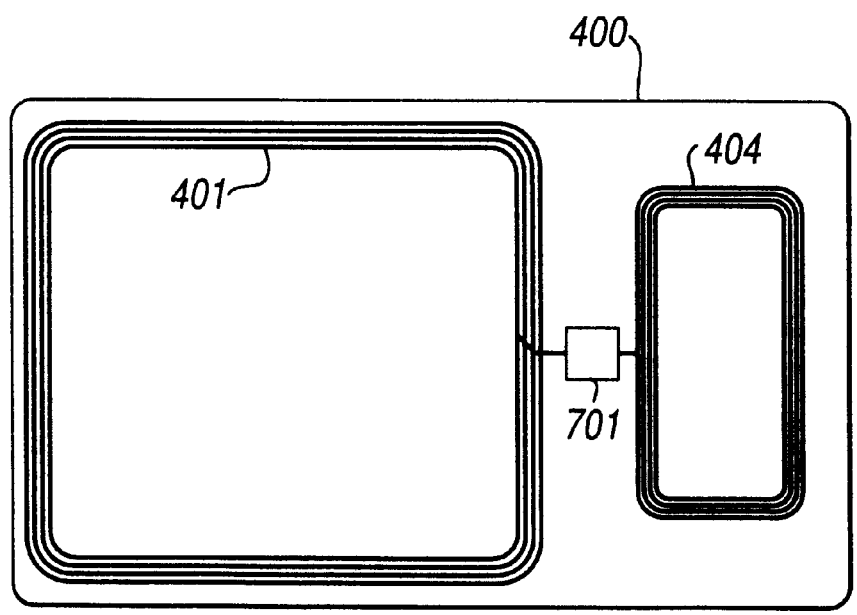
FIG. 7 is a plan view showing a second embodiment with antennas and an IC chip arranged in the wireless card.

A second embodiment of the present invention will be described referring to FIG. 7. The reception antenna 401 and the transmission antenna 404 are arranged on the wireless card 400 adjoining each other and the IC chip 701 is arranged between the antennas 401 and 404. Thus, it becomes advantageous to form the wireless card 400 thin without crossing the antenna wirings. Here, the loop area of the reception antenna 401 is made larger and the number of turns is also made larger than the transmission antenna 404.

If the construction is such that as described above, while transmitting power for the power generation by medium wave to the wireless card 400 from the wireless card reader/writer 300, multiplied frequency which is phase synchronous with the medium wave is generated in the wireless card 400. Using this generated frequency, transmission data is spread spectrum modulated and this modulated signal is transmitted in short waves to the wireless card reader/writer 300. Thus, it becomes possible to achieve the spread spectrum communication without providing a crystal oscillator in the wireless card 400. Further, it is also possible to achieve the communication without providing a battery in the wireless card 400. Further, while transmitting electric power from the wireless card reader/writer 300 to the wireless card 400, spread spectrum communication can be made continuously to the wireless card reader/writer 300 from the wireless card 400.

Accordingly, it becomes no longer necessary to provide such cards with an expensive yet unreliable crystal oscillator or with a limited life expensive battery. Furthermore, it becomes possible to achieve continuous and stable communication.

Further, when the reception antenna 401 and the transmission antenna 404 are provided in the wireless card 400 and their arrangement and antenna characteristics are optimized, efficient transmission and reception become possible. Further, when the arrangement of two antennas 401 and 404 and the IC chip 701 comprising each circuit in the wireless card 400 is optimized, for instance, it becomes possible to achieve a thin card in thickness less than 0.76 mm.

Further, in the embodiments described above, the wireless communication system applied to the wireless transmission/reception between the wireless card reader/writer and the spectrum spread communication type wireless card is explained. However, the present invention is not so limited, and is similarly applicable to a wireless communication system for the transmission/reception between other communication equipment for spread spectrum communication.

A second embodiment of the present invention will now be described referring to FIG. 8 to FIG. 11.

Figure 8:
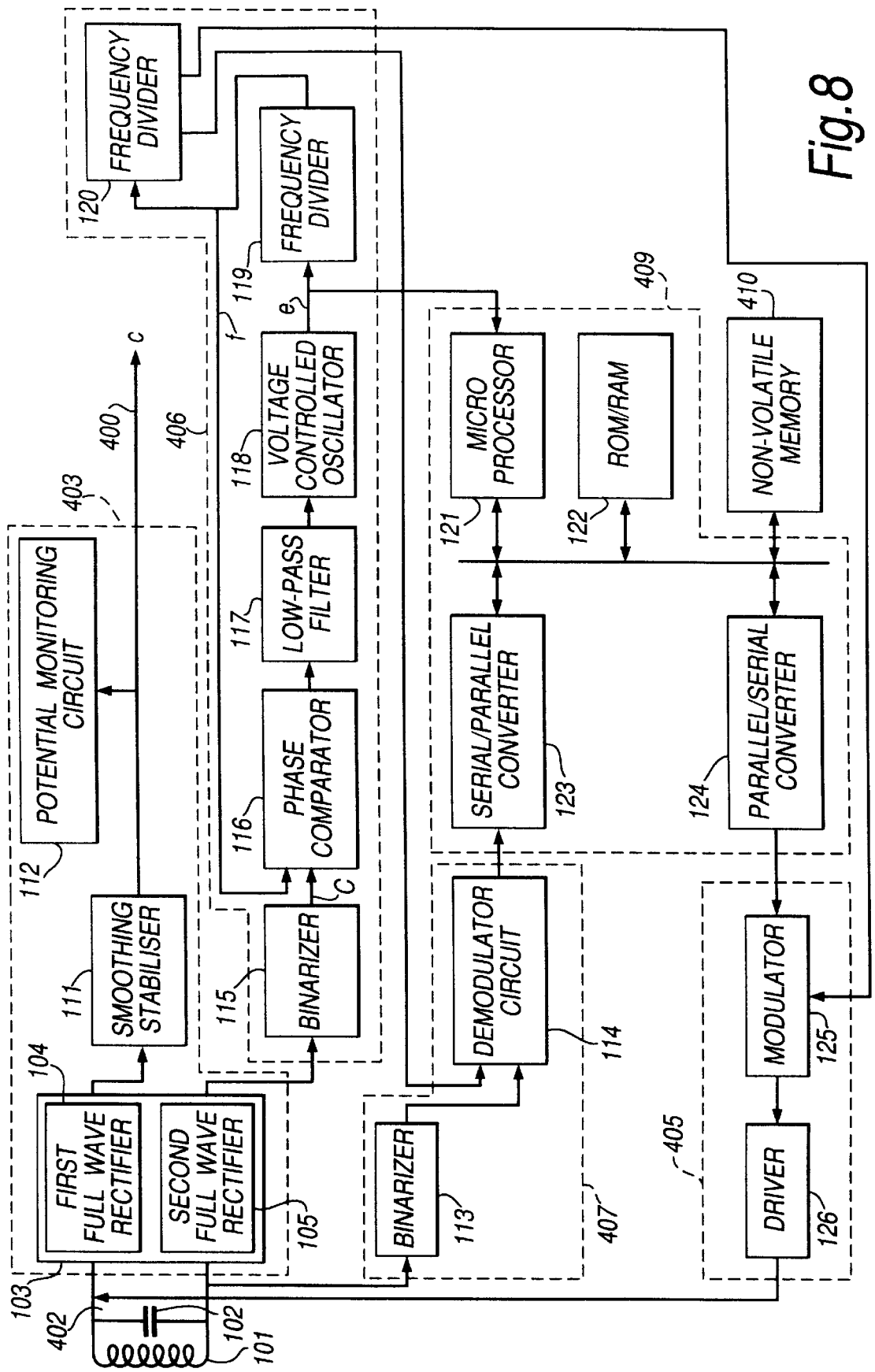
FIG. 8 is a block diagram showing the construction of the wireless card in the second embodiment of the present invention.

FIG. 8 shows the internal construction of the wireless card 400.

The tuning circuit 402 of the wireless card 400 is comprised of a loop antenna coil 101 as the reception antenna 401 and the transmission antenna 404 and a tuning capacitor 102. This tuning circuit 402 receives a two-phase modulated wave signal (frequency fo) from the transmission antenna 308 of the wireless card reader/writer 300. The two-phase modulated wave signal having a fo/2 carrier frequency is transmitted by a driver, which is described later, from the modulation circuit 405 through the tuning capacitor 102 and the loop antenna coil 101. The tuning circuit 402 is constructed to tune the carrier frequency fo of the received two-phase modulated wave signal so as to efficiently secure electric power for the power generation from the received wave.

The power generating circuit 403 generates power to be supplied to the entire circuit in the wireless card 400 by the two-phase modulated wave signal from the tuning circuit 402. This power generating circuit 403 is comprised of a full wave rectifier 103 to full wave rectify the two-phase modulated wave signal from the tuning circuit 402, a smoothing stabilizer 111 to smooth the full wave rectified output from the full wave rectified circuit 103 using a smoothing capacitor, and a potential monitoring circuit 112 to monitor potential of the generated power output from the smoothing stabilizer 111.

There are provided two full wave rectifiers in the full wave rectifier 103; a first full wave rectifier 104 and a second full wave rectifier 105, and the output of the first full wave rectifier 104 is supplied to the smoothing stabilizer 111.

Figure 9:
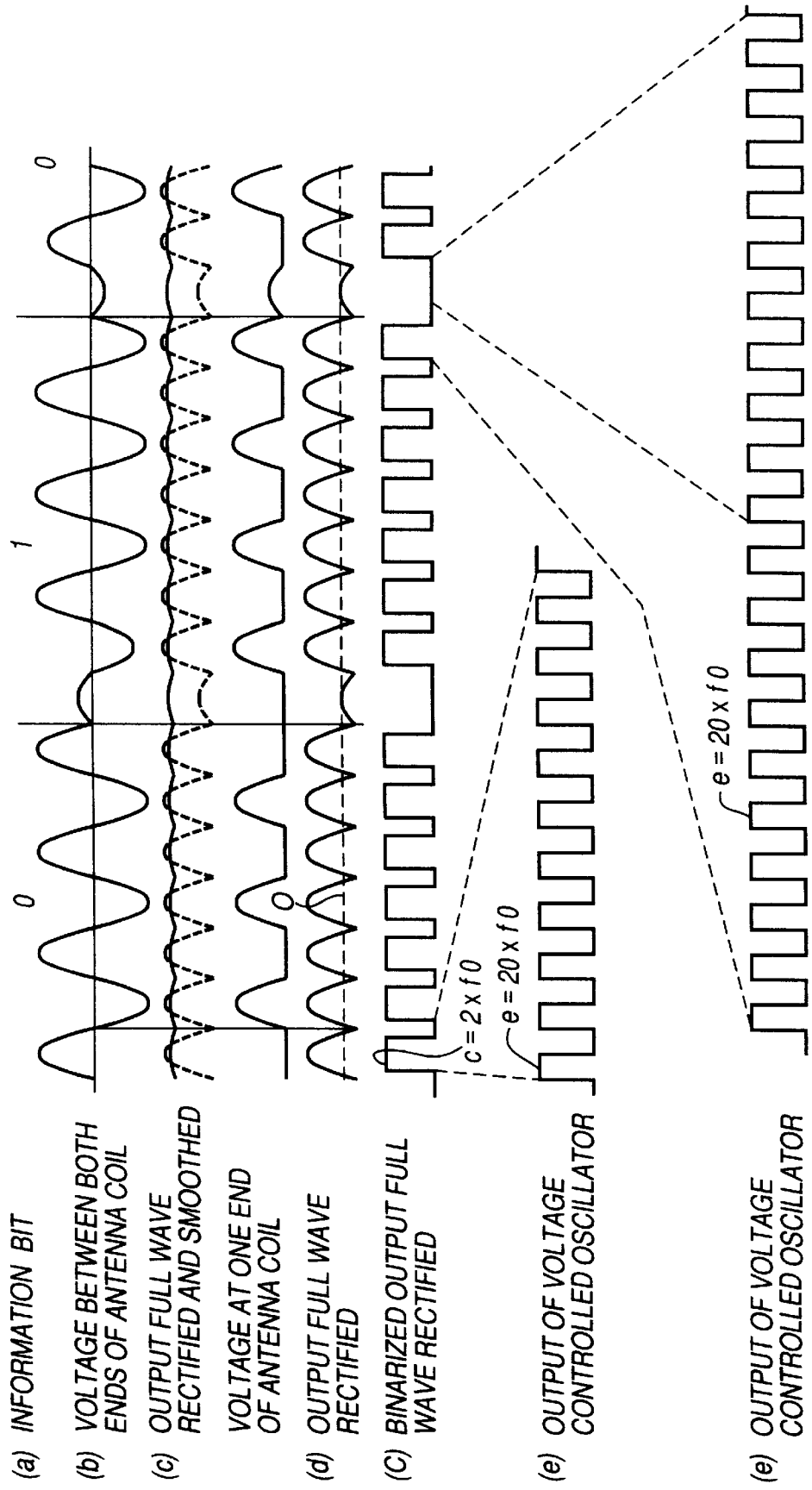
FIG. 9 is a signal waveform diagram for explaining the operation in the wireless card shown in FIG. 8.

When data is transmitted by two-phase modulated signal at medium wave, for instance, carrier frequency fo=200 KHz from the transmission antenna 308 of the wireless card reader/writer, antenna coil both ends voltage is obtained as induced voltage in the waveform as shown in FIG. 9 (b) at both ends of the loop antenna coil 101 of the wireless card 400 as a data storage medium.

This induced voltage b is full wave rectified by the first full wave rectifier 104 in the full wave rectifier 103 to a wave form shown by the chain line in FIG. 9, input to the smoothing stabilizer 111 from the full wave rectifier 104 where it is smoothed, and stabilized DC voltage in waveform c shown in FIG. 3 is obtained. This DC voltage c is supplied to each circuit in the wireless card 400.

The power generation here is carried out as long as the two-phase modulated signal is received and prescribed supply voltage can be obtained.

Further, the potential monitoring circuit 112 monitors DC voltage c and when it is at a sufficient level (2.7 V) for each circuit in the wireless card 400 to operate, it outputs "1." When it drops to an insufficient level for each circuit in the wireless card 400 to operate, it outputs "0".

The demodulation circuit 407 demodulates the two-phase modulated wave signal received by the tuning circuit 402, and is comprised of a binarizer 113 and a demodulator circuit 114.

The binarizer 113 is a circuit to binarize the two-phase modulated wave signal received by the tuning circuit 402, and the output of the binarizer 113 is supplied to the demodulator circuit 114.

The demodulator circuit 114 demodulates the output of the binarizer 113 by synchronously detecting the clock pulse obtained by a clock generating circuit 406, which will be described later, and the output of the binarizer 113.

The clock generating circuit 406 is comprised of a binarizer 115 which binarizes the output of the second full wave rectifier 105 of the full wave rectifier 103 shown in FIG. 8, a phase comparator 116, a low-pass filter 117, a voltage controlled oscillator 118 which oscillates clocks by the output voltage of the low-pass filter 117, a frequency divider circuit 119 which divides the output clock of the voltage controlled oscillator 118 into 10 fractions, and a divider 120 which divides the output clock of the divider 119 into 2 fractions and 4 fractions.

The output voltage d of the second full wave rectifier 105 of the full wave rectifier 103 shown in FIG. 9 and the slice level voltage o of the full wave rectified output voltage d shown by the dotted line in FIG. 9 are input to the binarizer 115, where the binarization is carried out and the full wave rectified binarized output C is obtained.

As the carrier frequency of the received two-phase modulated signal is fo=200 KHz, the binarized output C=2×200 KHz=400 KHz pulses are obtained.

However, as limited frequency band transmission is carried out at the phase switching point of information bit "1"and "0" of the two-phase modulated signal as shown in FIG. 9, interruption is produced in this full wave rectified binarized output C =400 KHz pulse. The full wave rectified binarized output C of the binarizer 115 is supplied to a PLL circuit.

That is, the PLL (Phase Lock Loop) circuit is comprised of the phase comparator 116, the low-pass filter 117 and the voltage controlled oscillator 118 which controls oscillation frequency by the output voltage of the low-pass filter 117. The full wave rectified binarized output C=400 KHz of the binarizer 115 is used as the reference input pulse of the phase comparator 116, the phase of the output of the voltage controlled oscillator 118 is compared with the phase of 10 divided output f by the frequency divider circuit 119 at the leading edge of the binarized output C and the output of this phase comparator 116 is supplied to the voltage controlled oscillator 118 via the low-pass filter 117.

A phase lock loop is constructed by the PLL circuit and as a result, the output pulse e=10×400 KHz=4 MHz of the voltage controlled oscillator 118 synchronized in phase with the full wave rectified binarized output C=400 KHz is obtained.

Figure 10:
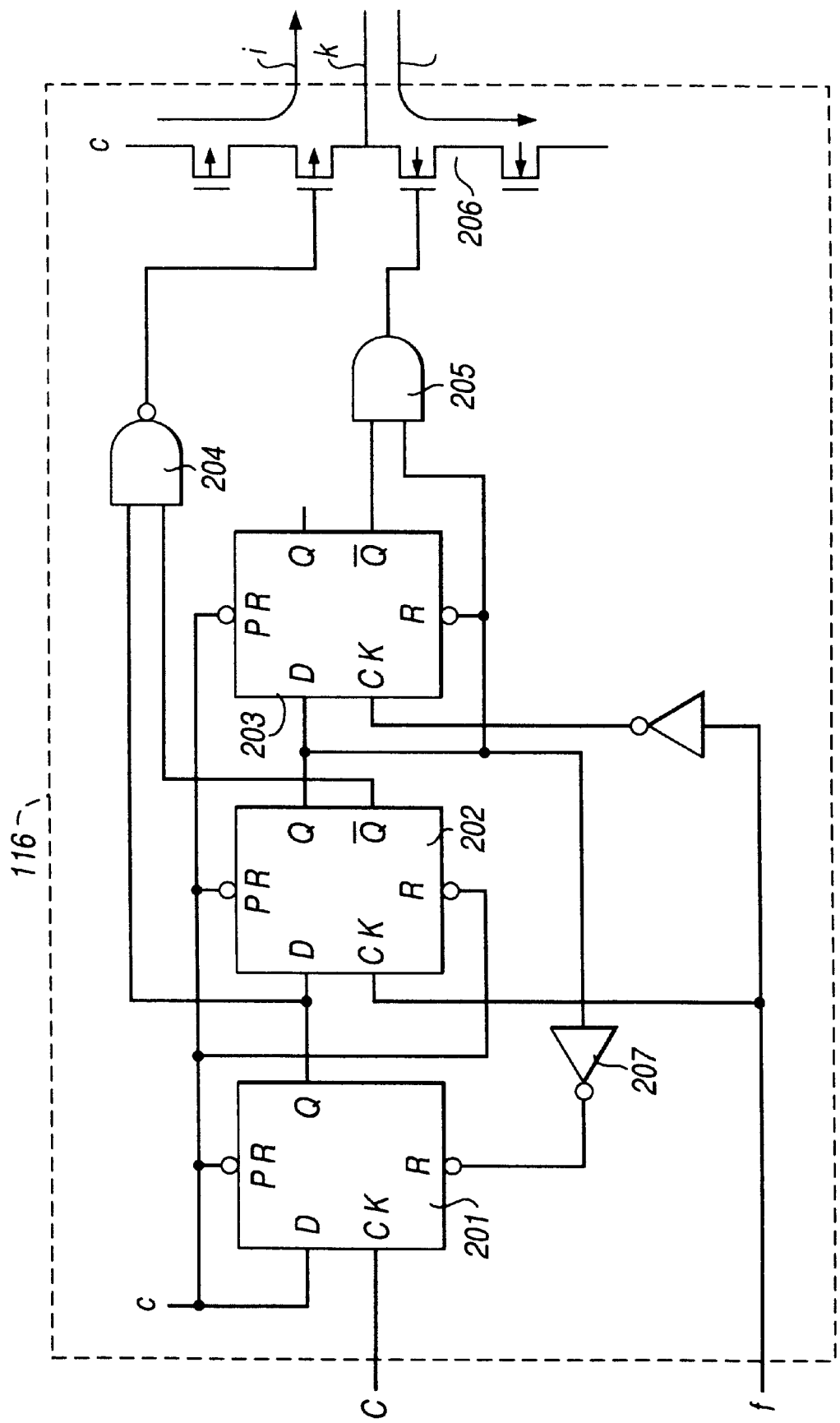
FIG. 10 is a circuit diagram showing the construction of a phase comparator in a clock generating circuit provided in the wireless card shown in FIG. 8.
Figure 11:
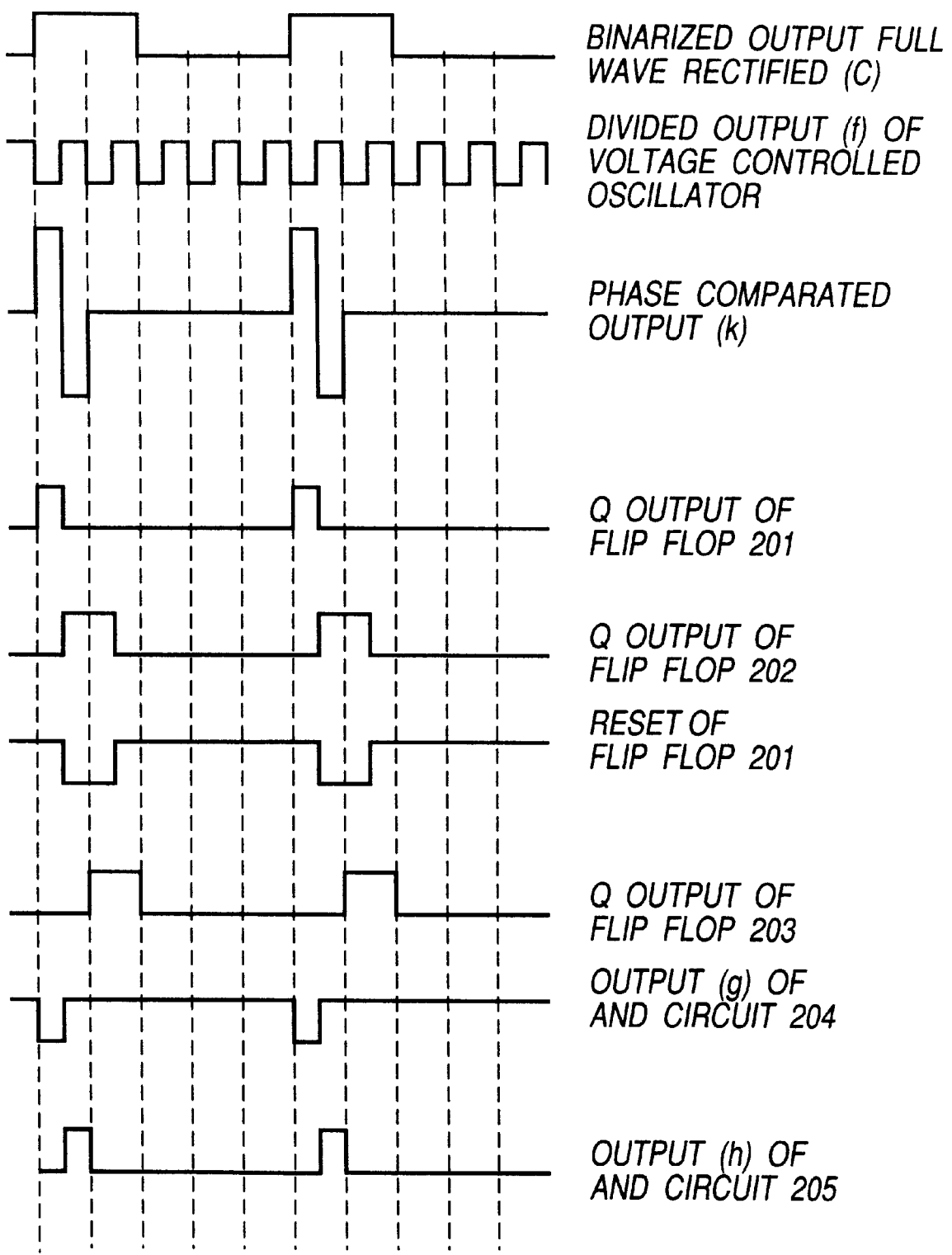
FIG. 11 is a signal waveform diagram for explaining the operation of the phase comparator shown in FIG. 10.

As the full wave rectified binarized output C was partially interrupted as described above, an example of the construction of the phase comparator 116 that is suited for partially interrupted pulses is shown in FIG. 10 and the operating waveforms of respective parts of this phase comparator 116 are shown in FIG. 11.

The phase comparator 116 performs the phase comparison of the output e of the voltage controlled oscillator 118 with the 10 divided output f by the frequency divider circuit 119 using the full wave rectified binarized output C=400 KHz of the binarizer 115 as the reference input pulse of the phase comparator 116 as described above. As shown in FIG. 10, the phase comparator 116 is comprised of flip flops 201, 202 and 203, a NAND circuit 204, an AND circuit 205 and a charge pump circuit 206.

On the flip flop 201, the full wave rectified binarized output C is connected to the terminal CK and the output of the smoothing stabilizer 111 is connected to the terminal D. As shown in FIG. 11, this flip flop is set at the leading edge of the full wave rectified binarized output C and the Q output becomes "1".

On the flip flop 202, the output of the flip flop 201 is connected to the terminal D and the output f, that is the output of the voltage controlled oscillator 118 divided to 10 by the frequency divider circuit 119, is connected to the terminal CK.

Accordingly, the flip flop 202 is set and the Q output becomes "1" at the leading edge of the divided output f after the flip flop 201 is set and the Q output becomes "1"as shown in FIG. 11.

As the Q output of the flip flop 202 is reversed by an inverter 207 and connected to the reset terminal of the flip flop 201, the flip flop 201 is reset at the leading edge of the Q output of the flip flop 202 as shown in FIG. 11.

Further, the Q output of the flip flop 201 is set at the leading edge of the divided output f after the flip flop 201 is reset and the Q output of the flip flop 202 becomes "0" as shown in FIG. 11.

The flip flop 203 is set at the trailing edge of the divided output f against the Q output of the flip flop 202 and therefore, the output of the flip flop 203 is delayed by a half period of the divided output f.

The NAND circuit 204 outputs the NAND (g) of the Q output of the flip flop 201 and the reversed output of the flip flop 202, and this output is supplied to the charge pump circuit 206.

The AND circuit 205 outputs the AND (h) of the Q output of the flip flop 202 and the reversed output of the flip flop 203, and this output is supplied to the charge pump circuit 206.

In the charge pump circuit 206, if the output of the NAND circuit 205 is "0", the current flows in the direction i in FIG. 10. If the output of the AND circuit 205 is "1", the current flows in the direction j in FIG. 10. Therefore, the output of the phase comparator 116 becomes the waveform shown by k in FIG. 11.

If the phase difference between the full wave rectified binarized output C and the 10 frequency divided output d is large as determined by phase comparator 116, the ON time of the output of the NAND circuit 205 becomes long and a high potential width of the output k becomes large; On the contrary, if the phase difference between the full wave rectified binarized output C and the 10 frequency divided output d is small, the ON time of the output of the NAND circuit 205 becomes short and the high potential width becomes small.

On the other hand, the output of the AND circuit 205 becomes constant depending on the pulse separation of the 10 frequency divided output d regardless of the phase difference between the full wave rectified binarized output C and the 10 frequency divided output d.

The phase comparator 116 described above performs the phase comparison only when there is the leading edge of the pulse of the full wave rectified binarized output C and therefore, the stabilized operation can be assured.

The output k of the phase comparator 116 is supplied to the low-pass filter 117 as shown in FIG. 8, and the low-pass filter 117 retains the specified potential based on the output k of the phase comparator 116.

That is, if the high potential interval of the output k of the phase comparator 116 is the same as the low potential interval (the phase of the full wave rectified binarized output C is in accord with the phase of the 10 frequency divided output d), the output voltage of the low-pass filter 117 is kept constant. Further, if the high potential interval of the output k of the phase comparator 116 is larger than the low potential interval (the phase of the 10 frequency divided output d is behind the full wave rectified binarized output C), the output voltage of the low-pass filter 117 goes up and the voltage controlled oscillator 118 oscillates higher frequency clocks.

By the phase lock loop circuit in such structure, it becomes possible to generate continuous pulses for the interrupted switching portion of information bit phase and it is possible to perform the high speed and high functional process by inputting the output pulse e=4 MHz of this voltage controlled oscillator 118 as a clock of a microprocessor 121 which is described later.

The 10 frequency divided output f=400 KHz pulse of the frequency divider circuit 119 is input to the frequency divider 120, where it is divided into 2 and supplied to the demodulator circuit 114. As the phase of this 2 divided frequency output m=200 KHz pulse is synchronous with carrier frequency fo=200 KHz of the received two-phase modulated signal, it is possible to demodulate it by synchronously detecting the output of the binarizer 113 of two-phase modulated signal.

The frequency divider 120 divides the 10 divided output d=400 KHz pulse of the frequency divider circuit 119 into 4 and this 4 divided output n=100 KHz pulse can be used as the carrier frequency of two-phase modulated signal from the wireless card 400.

It is possible to transmit data by superposing on the antenna coil 101 via a driver 126. The series of operations described above can also generate power continuously as long as the two-phase modulated signal is received and a high speed process can be made by generating multiple clocks that are phase synchronous with the received carrier wave and used as clocks for the microprocessor.

The control circuit 409 is comprised of a microprocessor 121, a ROM/RAM 122, a serial/parallel converter 123, and a parallel/serial converter 124. The received signal demodulated by the demodulator circuit 114 is converted into a parallel signal by the serial/parallel converter 123 and supplied to the microprocessor 121.

The microprocessor operates based on 4 MHz clock output from the voltage controlled oscillator 118 and performs a data read from a non-volatile memory 106, comprising an EEPROM which serves as a command analysis and storage mechanism, and data write into a non-volatile memory 410.

When transmitting data, data read out of the non-volatile memory 410 is converted into serial data by the parallel/serial converter 124.

Further, if "1" is supplied as a monitoring output of the potential monitoring circuit 112 (when the voltage is 2.7 V sufficient enough for the operation of each circuit in the wireless card 400), the microprocessor 121 cancels the system clear and becomes the operating state. If "0" is supplied, (when the voltage drops below the level sufficient enough for the operation of each circuit in the wireless card 300), the microprocessor 121 clears the system and stops the operation.

The modulation circuit (the modulation means) 405 is comprised of the modulator 125 and the driver 126. The modulation circuit 125 modulates transmission data converted into serial data by the parallel/serial converter 124 according to a prescribed modulation system using the 4 divided output g=100 KHz pulse of the frequency divider 120 as two-phase modulated signal carrier frequency, and supplies to the tuning circuit 402 via the driver 126.

The signal supplied to the tuning circuit 402 is emitted in the space and received by the reception antenna 309 of the wireless card reader/writer 300.

Under the legal control of weak wave requiring no license for the radio communication, the medium wave frequency band of several 100 KHz is advantageous for transmitting prescribed power rather than the short wave frequency band of several MHz.

That is, under the legal control, the electric field strength at the point of $\lambda/2\pi$ is regulated, where $\lambda$ is the wavelength of power and as the electric field strength is attenuated at 1 cube of a distance, the longer the wavelength $\lambda$, that is, the lower power transmission frequency, the more advantageous.

As described above, in the second embodiment of the present invention, when generating power by a wireless card provided with no battery from received two-phase modulated signal, a short wave band frequency clock is generated by performing radio communication by a medium wave band which is advantageous for power transmission, and the high speed process in the wireless card is made possible.

That is, as a continuous clock wave is generated by synchronizing phase with two-phase modulated signal carrier frequency for the interrupted portion and is used as clock for a built-in microprocessor by n multiplying this generated continuous wave, it becomes possible to operate the microprocessor at a high speed and also, to transmit the two-phase modulated signal.

Further, as a wireless card with no battery enables the building in of a microprocessor and give the check function, it becomes possible to achieve the higher function and strengthen a high speed processing security.

As described above in detail, according to the present invention, it is possible to provide a spread spectrum wireless communication system and a data storage medium no longer requiring an unreliable yet expensive crystal or a limited life expensive battery and further, capable of performing continuous stabilized communication.

Further, according to the present invention, it becomes possible to obtain several MHz to 10×several MHz from communication carrier within the regulatory control of weak power and it becomes possible to incorporate and operate a microprocessor in a data storage medium.

What is claimed is:

1. A wireless communication method for performing wireless transmitting and receiving between an external device and a storage medium, said method comprising:

receiving in said storage medium through wireless transmission an inquiry signal comprising a prescribed carrier signal having a prescribed carrier frequency;

converting in said storage medium said inquiry signal to operating power to power elements operable within said storage medium;

generating from said inquiry signal a clock signal, said clock signal being phase synchronous with said inquiry signal;

clocking a microprocessor provided in said storage medium based upon said clock signal and powering said microprocessor by said operating power;

storing in a storage provided in said storage medium transmission data under control of said microprocessor;

under control of said microprocessor, reading said transmission data from said storage;

under control of said microprocessor, spread spectrum encoding said transmission data read by a reader; and transmitting from said storage medium to said external device a signal comprising the spread spectrum encoded transmission data.

2. The method according to claim 1, wherein a frequency of said clock signal is higher than said prescribed carrier frequency.

3. The method according to claim 1, wherein said storage medium comprises a non-volatile memory.

4. The method according to claim 1, further comprising generating a signal of a prescribed frequency, wherein said spread spectrum encoding comprises spread spectrum encoding said transmission data using said prescribed carrier signal of said prescribed frequency.

5. The method according to claim 1, wherein said receiving receives the signals via a reception antenna and wherein said transmitting transmits signals via a transmission antenna.

6. The method according to claim 1, wherein said clock signal is phase synchronous with said prescribed carrier signal.

7. A storage medium for receiving and responding to wireless transmissions from an external device, said storage medium comprising:

a receiver for receiving through wireless transmission an inquiry signal comprising a prescribed carrier signal having a prescribed carrier frequency;

a first generator for converting said inquiry signal to operating power to power elements operable within said storage medium;

a second generator generating from said inquiry signal a clock signal, said clock signal being phase synchronous with said inquiry signal;

a controller comprising a microprocessor, said microprocessor being clocked based upon said clock signal and being powered by said operating power;

a storage for storing transmission data under control of said microprocessor;

a reader for reading said transmission data from said storage under control of said microprocessor;

a spread spectrum encoder controlled by said microprocessor to spread spectrum encode said transmission data read by said reader; and a transmitter for transmitting to said external device a signal comprising the spread spectrum encoded transmission data.

8. The storage medium according to claim 7, wherein said clock signal is phase synchronous with said prescribed carrier signal.

9. The storage medium according to claim 7, wherein a frequency of said clock signal is higher than said prescribed carrier frequency.

10. The storage medium according to claim 7, wherein said storage comprises a non-volatile memory.

11. The storage medium according to claim 7, wherein said second generator further generates a signal of a prescribed frequency, and wherein said spread spectrum encoder spread spectrum encodes said transmission data using said signal of said prescribed frequency.

12. The storage medium according to claim 7, further comprising a reception antenna and a transmission antenna, said receiver receiving signals via said reception antenna and said transmitter transmitting signals via said transmission antenna.

* * * * *